(12) United States Patent
Liu et al.

(10) Patent No.: US 11,759,763 B1
(45) Date of Patent: Sep. 19, 2023

(54) MIXED MATRIX CARBON MOLECULAR SIEVE (CMS) MEMBRANE AND USE OF MIXED MATRIX CMS MEMBRANE IN $C_2H_4/C_2H_6$ SEPARATION

(71) Applicant: NANJING TECH UNIVERSITY, Jiangsu (CN)

(72) Inventors: Gongping Liu, Jiangsu (CN); Guozhen Liu, Jiangsu (CN); Renhao Li, Jiangsu (CN); Long Cheng, Jiangsu (CN); Wanqin Jin, Jiangsu (CN)

(73) Assignee: NANJING TECH UNIVERSITY, Jiangsu (CN)

( * ) Notice: Subject to any disclaimer, the term of this patent is extended or adjusted under 35 U.S.C. 154(b) by 0 days.

(21) Appl. No.: 18/165,290

(22) Filed: Feb. 6, 2023

(30) Foreign Application Priority Data

Mar. 16, 2022 (CN) .......................... 202210256465.8

(51) Int. Cl.
| | |
|---|---|
| *B01D 53/02* | (2006.01) |
| *B01J 20/20* | (2006.01) |
| *B01D 71/02* | (2006.01) |
| *B01D 67/00* | (2006.01) |
| *B01D 53/22* | (2006.01) |
| *B01J 20/30* | (2006.01) |
| *B01J 20/28* | (2006.01) |
| *B01J 20/22* | (2006.01) |

(52) U.S. Cl.
CPC ............ *B01J 20/20* (2013.01); *B01D 53/228* (2013.01); *B01D 67/0067* (2013.01); *B01D 71/021* (2013.01); *B01J 20/22* (2013.01); *B01J 20/28026* (2013.01); *B01J 20/28033* (2013.01); *B01J 20/3007* (2013.01); *B01J 20/3078* (2013.01)

(58) Field of Classification Search
CPC ...... B01J 20/20; B01J 20/22; B01J 20/28026; B01J 20/28033; B01J 20/3007; B01J 20/3078; B01D 53/228; B01D 71/021
See application file for complete search history.

(56) References Cited

FOREIGN PATENT DOCUMENTS

CN 112717726 4/2021

OTHER PUBLICATIONS

Translation of CN 112717726; Univ Taiyuan Technology (Year: 2021).*

* cited by examiner

*Primary Examiner* — Christopher P Jones
(74) *Attorney, Agent, or Firm* — JCIPRNET

(57) ABSTRACT

The present disclosure relates to a mixed matrix carbon molecular sieve (CMS) membrane, a preparation method of the mixed matrix CMS membrane, and use of the mixed matrix CMS membrane in $C_2H_4/C_2H_6$ separation, and belongs to the technical field of membrane separation. The present disclosure solves the problem that the CMS materials in the prior art exhibit low selectivity and low flux during an ethylene/ethane separation process. In this patent, $C_3N_4$ is used as a filling particle to prepare a mixed matrix membrane (MMM), and the MMM is pyrolyzed to prepare a CMS membrane. The $C_3N_4$/6FDA-DAM MMM has prominent $C_2$ separation performance.

6 Claims, 3 Drawing Sheets

MIXED MATRIX CARBON MOLECULAR SIEVE (CMS) MEMBRANE AND USE OF MIXED MATRIX CMS MEMBRANE IN $C_2H_4/C_2H_6$ SEPARATION

CROSS-REFERENCE TO RELATED APPLICATION

This application claims the priority benefit of China application serial no. 202210256465.8, filed on Mar. 16, 2022. The entirety of the above-mentioned patent application is hereby incorporated by reference herein and made a part of this specification.

BACKGROUND

Technical Field

The present disclosure relates to a mixed matrix carbon molecular sieve (CMS) membrane, a preparation method of the mixed matrix CMS membrane, and use of the mixed matrix CMS membrane in $C_2H_4/C_2H_6$ separation, and belongs to the technical field of membrane separation.

Description of Related Art

Gas separation processes are essential unit operations for the chemical industry and environmental protection, such as the separation of ethylene and ethane ($C_2H_4/C_2H_6$). Ethylene and ethane ($C_2$) are important petrochemicals. In olefin production, petroleum is subjected to fractionation to produce ethane, and then ethane is subjected to pyrolysis to produce ethylene.

Traditional gas separation operations include an absorption process, a pressure swing adsorption (PSA) process, and a low-temperature rectification process. The absorption process is a unit operation where one substance is dissolved into another substance based on different chemical affinities of a solvent and a solute. The absorption process is widely used for CO2 separation, and an absorbent is usually monoethanolamine (MEA) or a solid absorbent. However, the solvent recovery requires high energy consumption. The PSA process is based on the ability of an adsorbent (such as a molecular sieve) to adsorb a gas at a high gas-phase partial pressure. Thus, the correct selection of an adsorbent is critical to the performance and service life of the adsorbent. A separated gas is adsorbed at a high partial pressure and then desorbed at a low partial pressure. The low-temperature rectification process achieves the separation based on different evaporation points of fed components. The low-temperature rectification process can produce and enrich $C^{4+}$, ethane, propane, or the like, but involves high cost and high energy consumption.

A gas separation membrane technology achieves the separation of two different gases with a pressure gradient as a driving force, and has advantages such as no phase transition, high efficiency, low energy consumption, and easy operations compared with the traditional separation technology. Membrane materials can be divided into porous membranes and dense membranes according to the pore size. In porous membrane materials, a molecular mean free path (λ) is defined as an average distance traveled by a gas molecule before colliding with another gas molecule. When a pore size r of a membrane is greater than a mean free path λ. of a gas molecule, an interaction between gas molecules is large, a transfer mode is viscous flow, and the membrane material hardly provides a separation action. When a pore size r of a membrane is smaller than λ, an interaction between a gas molecule and a pore wall is greater than an interaction between gas molecules, and a transfer mode is called Knudsen diffusion. In this case, a Knudsen diffusion coefficient of the gas molecule is inversely proportional to a square root of a molecular mass.

Thus, a separation coefficient of two gases based on Knudsen diffusion is a ratio of square roots of molecular masses of the two gases. In dense membrane materials, a gas transfer is based on a dissolution-diffusion mechanism. A dissolution-diffusion model includes the following three parts: adsorption of a gas phase in a raw material mixture according to a partition coefficient between the gas phase and a polymer; diffusion of each component in a membrane according to an activity gradient; and desorption of each component in the penetrated gas phase from the membrane. In an actual diffusion-controlled separation process, an efficient gas transfer is achieved through a concentration gradient produced in a membrane. Both the Knudsen diffusion and the dissolution-diffusion model enable the selective transfer of a gas, thereby achieving the separation of different gases.

A CMS membrane is a new membrane material prepared through high-temperature pyrolysis of a carbon-containing precursor in an inert gas or under vacuum protection. In 1983, Koresh and Soffer first reported a defect-free hollow fiber CMS membrane prepared through high-temperature pyrolysis of a cellulose hollow fiber as a precursor, and discovered that such a membrane exhibited a better gas separation effect than a polymer membrane. Compared with other inorganic membranes, CMS membranes are easy to prepare, defect-free membranes can be produced through direct pyrolysis of polymer membranes, and the corresponding industrialization can be expanded based on existing experience such as hollow fiber spinning technology. CMS membranes have excellent separation performance and easy performance control, and rigid slit-like pore structures thereof exhibit better plasticization resistance and less swelling capacity than polymers. CMS membranes have excellent chemical and thermal stability, and exhibit quite promising separation performance superior to an upper limit of separation performance of polymer membranes for various gases.

At present, the research on precursors for CMS membranes is no longer limited to single polymers, and the blending, modification, and inorganic particle doping of polymers have attracted the attention of many researchers. A mixed matrix membrane (MMM) can be doped with an inorganic particle to change a pore structure of a CMS membrane and improve the gas separation performance of the CMS membrane. However, a filling substance for preparing a CMS membrane needs to meet the following two conditions: 1. The filling substance needs to have prominent thermal stability and structural stability during high-temperature pyrolysis. 2. The filling substance needs to have prominent compatibility with a polymer material, thereby reducing the defects caused by the mismatch between a size of a filling material and a coefficient of thermal expansion (CTE).

SUMMARY

The present disclosure is intended to solve the problem that the CMS materials in the prior art exhibit low selectivity and low flux during an ethylene/ethane separation process. In present disclosure, $C_3N_4$ is used as a filling particle to prepare an MMM, and the MMM is pyrolyzed to prepare a CMS membrane. The $C_3N_4$/6FDA-DAM MMM has prominent C2 separation performance.

A mixed matrix CMS membrane is provided, including: a carbon matrix and a $C_3N_4$ nanosheet dispersed in the carbon matrix.

The carbon matrix is obtained through pyrolysis of a polymer.

The polymer is 6FDA-DAM.

The $C_3N_4$ nanosheet is subjected to a hot peeling treatment.

A content of the $C_3N_4$ nanosheet in the carbon matrix is 0.5 wt % to 10 wt %.

A preparation method of the mixed matrix CMS membrane is provided, including the following steps:

step 1: dissolving the polymer in a solvent, and adding the $C_3N_4$ nanosheet to obtain a casting solution; and step 2: coating the casting solution on a surface of a substrate, and conducting a pyrolysis treatment to obtain the mixed matrix CMS membrane.

A preparation method of the $C_3N_4$ nanosheet includes: heating tripolycyanamide to allow polymerization, cooling to room temperature, and conducting the hot peeling treatment.

The polymerization is conducted as follows: heating to 450° C. to 600° C. at 1° C./min to 5° C./min, and keeping the temperature for 2 h to 6 h.

The hot peeling treatment is conducted at 500° C. to 600° C. for 1 h to 4 h.

The solvent is tetrahydrofuran (THF).

The casting solution is coated on the surface of the substrate to obtain a precursor polymer membrane with a thickness of 10 μm to 300 μm.

The pyrolysis treatment is one selected from the group consisting of fast pyrolysis and slow pyrolysis;

the slow pyrolysis is conducted under the following parameters:

1) heating from 20° C. to 50° C. at a heating rate of 3° C./min; 2) heating from 50° C. to 250° C. at a heating rate of 6.67° C./min; 3) heating from 250° C. to $T_{max}$–15° C. at a heating rate of 3.85° C./min; 4) heating from $T_{max}$–15° C. to $T_{max}$° C. at a heating rate of 0.15° C./min; 5) keeping at $T_{max}$° C. for 2 h; and 6) naturally cooling to room temperature; and the fast pyrolysis is conducted under the following parameters:

1) heating from 20° C. to 50° C. at a heating rate of 3° C./min; 2) heating from 50° C. to $T_{max}$-50° C. at a heating rate of 10° C./min; 3) heating from $T_{max}$–50° C. to $T_{max}$® C. at a heating rate of 1° C./min; and 4) naturally cooling to room temperature.

The $T_{max}$ ranges from 500° C. to 700° C.

A use of the mixed matrix CMS membrane in an ethylene/ethane separation process is provided.

The present disclosure discovers that, when an MMM is prepared with 6FDA-DAM as a continuous phase and a $C_3N_4$ nanosheet as a filling material, there is excellent compatibility between the $C_3N_4$ nanosheet and the CMS material and the prepared mixed matrix CMS membrane exhibits prominent C2 separation performance.

Graphitic carbon nitride (g-$C_3N_4$) is a graphene-like layered two-dimensional (2D) nanomaterial, and interlayer passways among nanosheets and sub-nanopore structures thereof can provide transport passways and sieving passways for gas molecules. An interlayer passway of g-$C_3N_4$ is approximately of 3.3 Å, and sub-nanopores with a diameter of 3.1 Å to 3.4 Å are distributed on a surface of the interlayer passway.

In the preparation method of the present disclosure, after the hot peeling treatment of the $C_3N_4$ nanosheet, a layer structure of the nanosheet is effectively changed, such that the prepared nanosheet exhibits a prominent separation coefficient.

In the preparation method of the present disclosure, the fast pyrolysis is adopted during the pyrolysis process, and the prepared CMS membrane is significantly improved in terms of permeability coefficient and separation performance.

DESCRIPTION OF THE EMBODIMENTS

Figure 1:
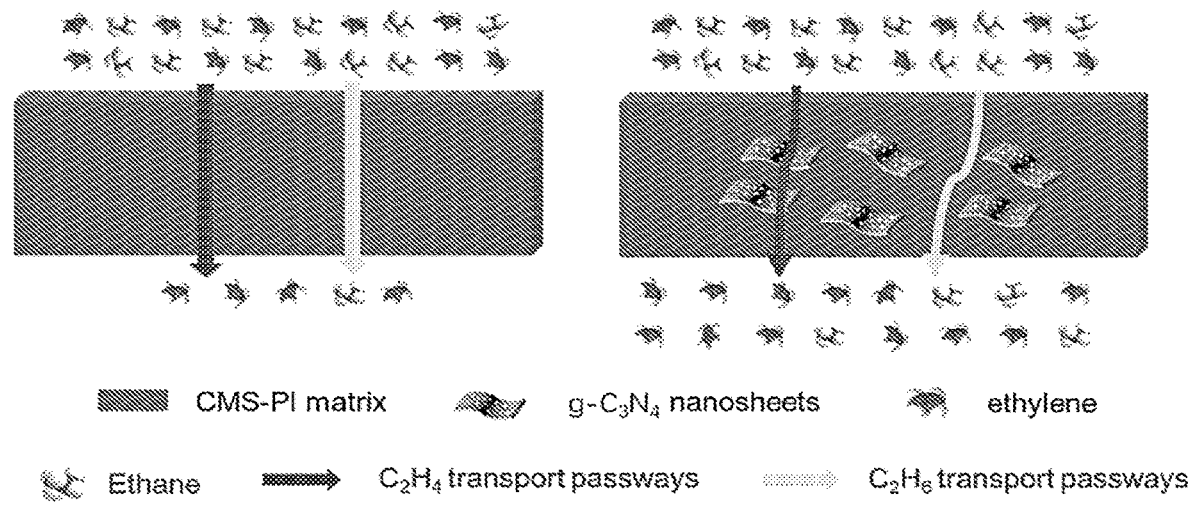
FIG. 1 is a schematic diagram of a $C_3N_4$/6FDA-DAM mixed matrix CMS membrane.

Example 1 Preparation of a $C_3N_4$ Nanosheet

The $C_3N_4$ nanosheet was prepared through polymerization of tripolycyanamide at 500° C.: A specified amount of tripolycyanamide was placed in a crucible, heated to 550° C. at a heating rate of 2.3° C./min and kept at 550° C. for 4 h, and cooled to room temperature at a cooling rate of 1° C./min.

Post-treatment stage: Hot peeling was conducted at 550° C. in an air atmosphere for 2 h to obtain the nanosheet.

Example 2 Preparation of a Mixed Matrix CMS Membrane

Synthesis of 6FDA-DAM (where 6FDA was 4,4'-(hexafluoroisopropylidene)diphthalic anhydride and DAM was 2,4-diaminotrimethylbenzene).

A polymer was synthesized through two-step growth polymerization. In a first step, a dianhydride monomer (120° C.) and a diamine monomer (50° C.) each were taken in a stoichiometric ratio of 1:1 and then dried under vacuum for 24 h. The diamine monomer was then dissolved in an N-methylpyrrolidone (NMP) solvent, and after the diamine monomer was completely dissolved, the dianhydride monomer was added to allow a reaction for 24 h to produce polyamic acid (PAA). Then triethylamine (TEA) and acetic anhydride were added to the resulting reaction mixture, such that the PAA was subjected to a dehydration reaction for 24 h to produce polyimide (PI). All operations were completed under nitrogen protection. The resulting product was washed three times with methanol, then soaked in a methanol solution for 16 h, and finally vacuum-dried at 200° C. for 24 h to remove the residual solvent.

6FDA-DAM was vacuum-dried at 120° C. for 24 h and then dissolved in THF. A filling particle (the $C_3N_4$ nanosheet) was thoroughly ground, added to THF, and stirred for dispersion. The fully-dispersed filling particles were added to a THF solution in which 6FDA-DAM was dissolved, and the resulting mixture was subjected to an ultrasonic treatment for 10 min and then thoroughly mixed for 24 h at room temperature with a mixer. A $C_3N_4$/6FDA-DAM doping amount was 3 wt % (which was converted according to a mass ratio of the nanosheet/(the nanosheet+ the polymer)). The resulting casting solution, a smooth glass plate, and a wet membrane preparer were placed into a glove bag and pre-saturated with THF in the glove bag for at least 4 h. The casting solution was blade-coated to prepare a precursor polymer membrane with a thickness of about 50 µm to 70 µm. The precursor membrane was cut into a circular shape with a diameter of about 25 mm and sandwiched between two clean quartz plates. The quartz plates were porous and breathable materials and could release pyrolysis by-products in time. The quartz plates were placed in a tube furnace. Pyrolysis was conducted under vacuum (<1 Pa), where the pressure was monitored by a 0.1 Pa to 1 bar pressure sensor. A thickness of the CMS membrane was measured with a high-accuracy micrometer.

The following two pyrolysis methods were adopted: slow pyrolysis and fast pyrolysis.

The slow pyrolysis for the polymer membrane and $C_3N_4$/6FDA-DAM was as follows:

1) a reaction system was heated from 20° C. to 50° C. at a heating rate of 3° C./min; 2) the reaction system was heated from 50° C. to 250° C. at a heating rate of 6.67° C./min;

3) the reaction system was heated from 250° C. to $T_{max}$–15° C. at a heating rate of 3.85° C./min;

4) the reaction system was heated from $T_{max}$–15° C. to $T_{max}$° C. at a heating rate of 0.15° C./min;

5) the reaction system was kept at $T_{max}$® C. for 2 h; and 6) the reaction system was naturally cooled to room temperature.

The fast pyrolysis for the $C_3N_4$/6FDA-DAM was as follows:

1) a reaction system was heated from 20° C. to 50° C. at a heating rate of 3° C./min; 2) the reaction system was heated from 50° C. to $T_{max}$–50° C. at a heating rate of 10° C./min; 3) the reaction system was heated from $T_{max}$–50° C. to $T_{max}$® C. at a heating rate of 1° C./min; and 4) the reaction system was naturally cooled to room temperature.

The two temperatures of 550° C. and 650° C. were adopted for the above $T_{max}$ in the experiment.

Comparative Example 1

During the preparation of a CMS membrane in this comparative example, a 6FDA-DAM polymer was prepared by the same method as that in Example 2, except that no $C_3N_4$ nanosheet was added.

A slow pyrolysis program was adopted for the pyrolysis process.

Hot peeling treatment results of the $C_3N_4$ nanosheet

On the basis of Example 1, nanosheets undergoing a hot peeling treatment at 550° C. and 650° C. respectively were used for XRD characterization.

Figure 2:
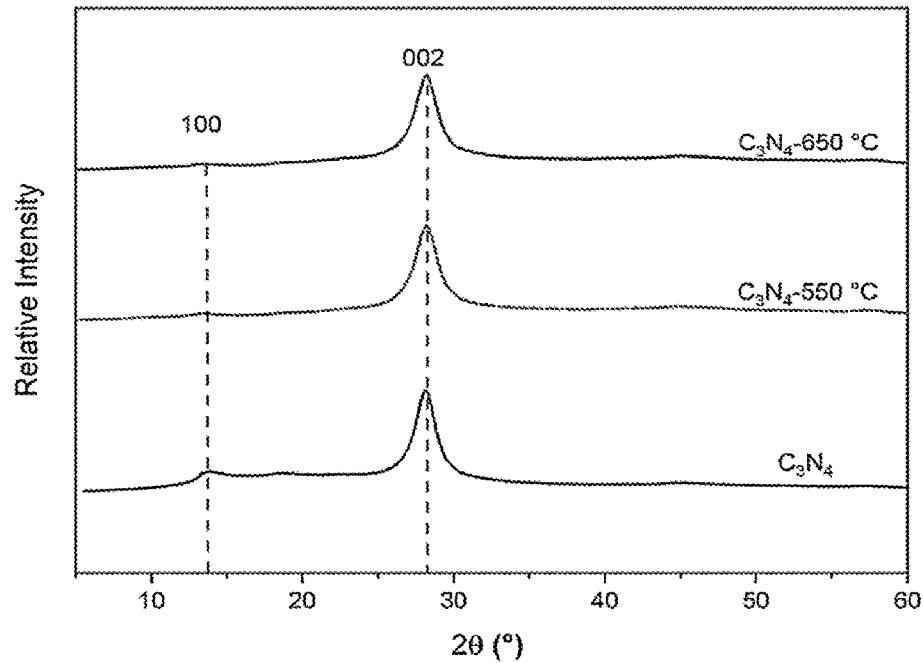
FIG. 2 shows X-ray diffractometry (XRD) characterization patterns of a $C_3N_4$ nanosheet.

The g-$C_3N_4$ nanosheet was characterized through wide-angle XRD, and XRD characterization patterns are shown in FIG. 2. The nanosheets undergoing hot peeling treatment at 550° C. and 650° C. respectively had a (100) characteristic peak at around 13.48° and a (002) characteristic peak at around 28.34°, and the peak positions were consistent with that of the g-$C_3N_4$ nanosheet, indicating that, after the hot peeling treatment, the g-$C_3N_4$ nanosheet still retained a typical 2D structure and had excellent thermal stability.

Figure 3:
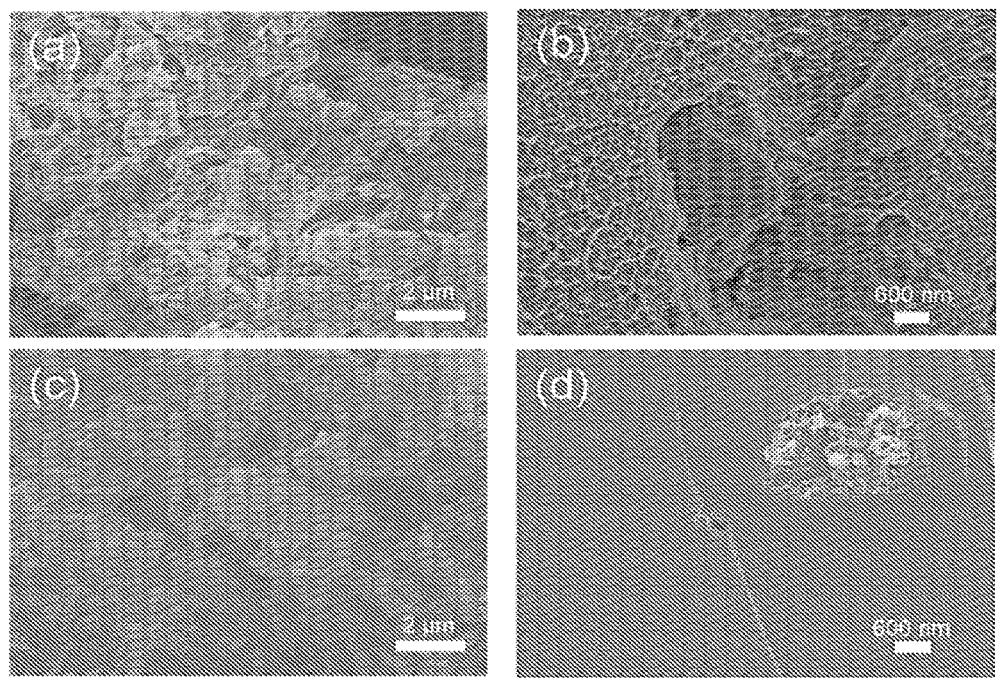
FIG. 3 shows scanning electron microscopy (SEM) images of a $C_3N_4$ nanosheet before and after thermal etching and a $C_3N_4$/6FDA-DAM membrane before and after carbonization, where (a) shows a $C_3N_4$ nanosheet, (b) shows a cross section of $C_3N_4$/6FDA-DAM, (c) shows a $C_3N_4$ nanosheet after thermal etching, and (d) shows a cross section of CMS-$C_3N_4$/6FDA-DAM.

FIG. 3 shows SEM images of the $C_3N_4$ nanosheet and 3 wt % $C_3N_4$/6FDA-DAM before and after the thermal treatment, and it can be seen that, after the thermal etching at 550° C., a size of the $C_3N_4$ nanosheet was reduced. The size of the $C_3N_4$ nanosheet changed because the nanosheet layers were reduced after the thermal etching, which improved the selective separation compared with the multi-layer nanosheet. After the MMM was prepared into a CMS membrane, the occurrence of structural defects was avoided and the quality of the CMS membrane was improved.

It can be seen from a cross section of the $C_3N_4$/6FDA-DAM membrane that the $C_3N_4$ nanosheet had prominent compatibility with the continuous phase 6FDA-DAM, and after the CMS membrane was prepared through pyrolysis, the existence of the $C_3N_4$ nanosheet could be clearly observed.

Gas separation performance of the $C_3N_4$/6FDA-DAM mixed matrix CMS membrane

Figure 4:
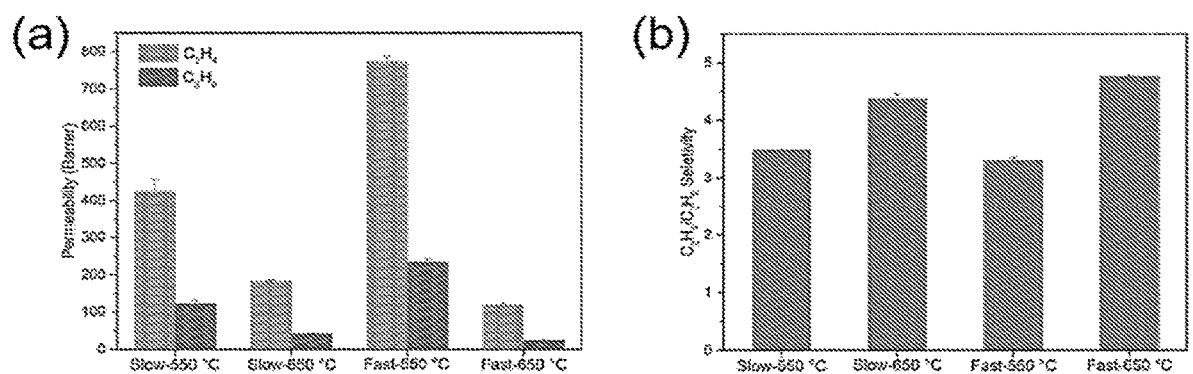
FIG. 4 shows the C2 separation performance of $C_3N_4$-doped CMS membranes.
Figure 5:
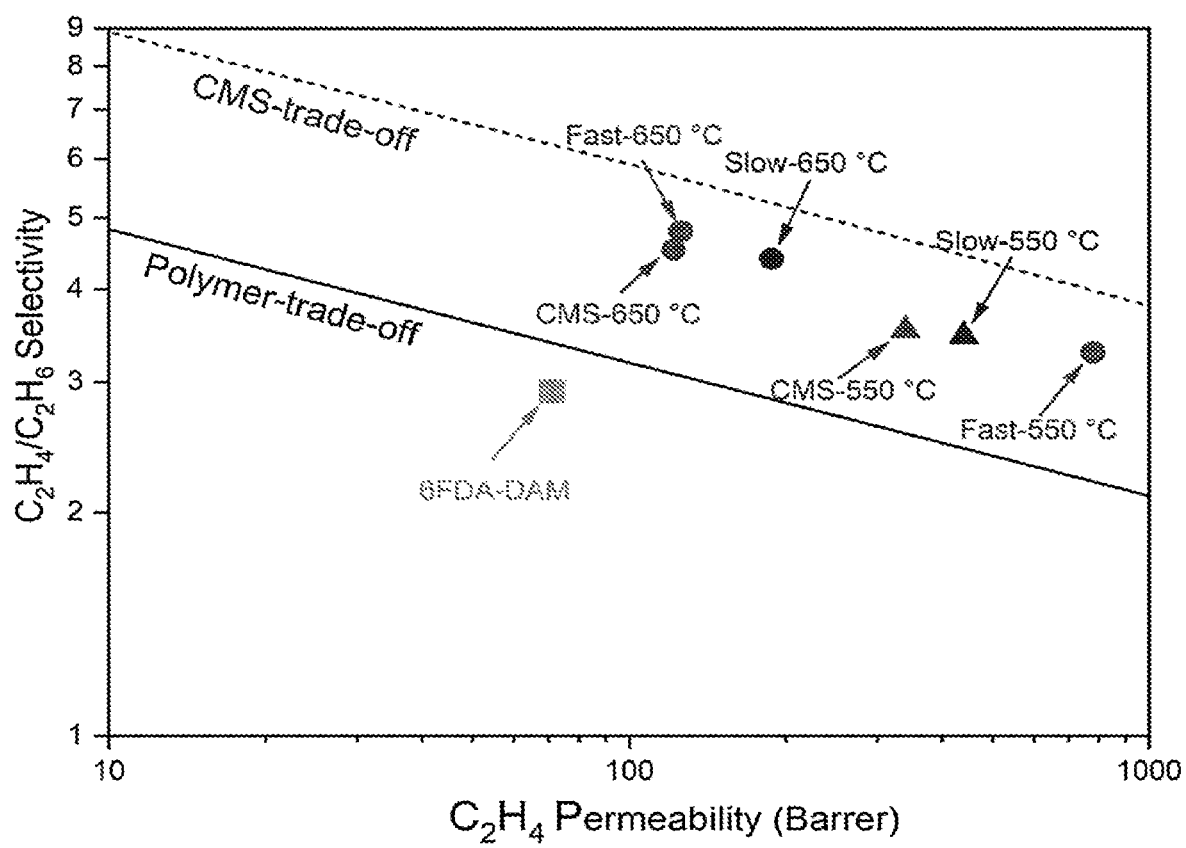
FIG. 5 shows the C2 separation performance of $C_3N_4$-doped CMS membranes and CMS-6FDA-DAM.

The separation performance for a C2 mixed gas of the CMS membrane prepared through pyrolysis of $C_3N_4$/6FDA-DAM is shown in FIG. 4 (experimental conditions were as follows: ethylene:ethane volume ratio: 1:1, pressure: 3 bar, and temperature: 35° C.). The C2 separation performance of the CMS membrane prepared through slow pyrolysis was first discussed. The CMS membrane prepared through slow pyrolysis at 550° C. had a $C_2H_4$ permeability coefficient of 440 Barrer and a $C_2H_4$/$C_2H_6$ selectivity of 3.46. When the pyrolysis temperature was increased from 550° C. to 650° C., the gas permeability coefficient was decreased and the selectivity was increased. When the fast pyrolysis was adopted, the membrane obtained through fast pyrolysis at 550° C. exhibited the highest $C_2H_4$ permeability coefficient of 780 Barrer among the four membranes; and the membrane obtained through fast pyrolysis at 650° C. exhibited the highest $C_2H_4$/$C_2H_6$ selectivity of 4.79 among the four membranes. The slow and fast pyrolysis methods still follow the law that, with the increase of the pyrolysis temperature, the gas permeability coefficient is decreased and the selectivity is increased.

In terms of performance of polymer CMS membranes, when the slow pyrolysis was adopted, the addition of the $C_3N_4$ nanosheet increased the gas permeability coefficient of the CMS membrane and caused a slight loss in the selectivity, where for a membrane obtained through slow pyrolysis at 550° C., the permeability coefficient was increased by 29.4% and the selectivity was reduced by 1.7% (for the pure polymer CMS membrane obtained through slow pyrolysis at 550° C. in Comparative Example 1, the $C_2H_4$ permeability coefficient was 340 Barrer and the selectivity was 3.52; and for the membrane obtained through fast pyrolysis at 550° C., the $C_2H_4$ permeability coefficient was 122 Barrer and the selectivity was 4.52). When the fast pyrolysis was adopted, the membrane obtained through fast pyrolysis at 550° C. had the highest gas permeability coefficient, but the lowest selectivity; and for the CMS membrane obtained through fast pyrolysis at 650° C., the gas permeability coefficient and the selectivity were both improved. A change of separation performance of the CMS membrane indicates a dual effect of the pyrolysis temperature on the $C_3N_4$ nanosheet and the pure CMS membrane. The C2 separation performance of the CMS membrane obtained through fast pyrolysis is close to CMS-trad-off.

Influence of the hot peeling treatment of the $C_3N_4$ nanosheet on gas separation performance of a membrane Compared with Example 2, a $C_3N_4$ nanosheet that had not undergone a hot peeling treatment was used for doping.

A 3 wt % MMM was subjected to slow pyrolysis at 550° C., and the resulting membrane had a $C_2H_4$ permeability coefficient of 660.61 Barrer and a $C_2H_4/C_2H_6$ selectivity of 3.12; and the CMS membrane prepared under the same conditions in Example 1 had a selectivity of 3.46.

A 5 wt % MMM was subjected to slow pyrolysis at 550° C., and the resulting membrane had a $C_2H_4$ permeability coefficient of 2,092.4 Barrer and a $C_2H_4/C_2H_6$ selectivity of 2.64; and a 5 wt % MMM was subjected to slow pyrolysis at 650° C., and the resulting membrane had a $C_2H_4$ permeability coefficient of 882 Barrer and a $C_2H_4/C_2H_6$ selectivity of 2.98.

It can be known that a separation membrane prepared with a $C_3N_4$ nanosheet that has undergone a hot peeling treatment exhibits better separation selectivity for C2 than CMS prepared with a $C_3N_4$ nanosheet that has not undergone a hot peeling treatment.

What is claimed is:

1. A mixed matrix carbon molecular sieve membrane, comprising a carbon matrix and a $C_3N_4$ nanosheet dispersed in the carbon matrix,
   wherein the carbon matrix is obtained through pyrolysis of a polymer;
   a content of the $C_3N_4$ nanosheet in the carbon matrix is 0.5 wt % to 10 wt %;
   a preparation method of the mixed matrix carbon molecular sieve membrane comprises the following steps:
   step 1: dissolving the polymer in a solvent, and adding the $C_3N_4$ nanosheet to obtain a casting solution; and
   step 2: coating the casting solution on a surface of a substrate, and conducting a pyrolysis treatment to obtain the mixed matrix carbon molecular sieve membrane; and
   a preparation method of the $C_3N_4$ nanosheet comprises: heating tripolycyanamide to allow polymerization, cooling to room temperature, and conducting a hot peeling treatment,
   wherein the hot peeling treatment is conducted at 500° C. to 600° C. for 1 h to 4 h.

2. The mixed matrix carbon molecular sieve membrane according to claim 1, wherein the polymerization is conducted as follows: heating to 450° C. to 600° C. at 1° C./min to 5° C./min, and keeping the temperature for 2 h to 6 h.

3. The mixed matrix carbon molecular sieve membrane according to claim 1, wherein the polymer is 6FDA-DAM.

4. The mixed matrix carbon molecular sieve membrane according to claim 1, wherein the solvent is tetrahydrofuran.

5. The mixed matrix carbon molecular sieve membrane according to claim 1, wherein the casting solution is coated on the surface of the substrate to obtain a precursor polymer membrane with a thickness of 10 μm to 300 μm.

6. The mixed matrix carbon molecular sieve membrane according to claim 1, wherein the pyrolysis treatment is one selected from the group consisting of fast pyrolysis and slow pyrolysis;
   the slow pyrolysis is conducted under the following parameters: 1) heating from 20° C. to 50° C. at a heating rate of 3° C./min; 2) heating from 50° C. to 250° C. at a heating rate of 6.67° C./min; 3) heating from 250° C. to $T_{max}$-15° C. at a heating rate of 3.85° C./min; 4) heating from $T_{max}$-15° C. to $T_{max}$° C. at a heating rate of 0.15° C./min; 5) keeping at $T_{max}$° C. for 2 h; and 6) naturally cooling to room temperature, wherein the $T_{max}$ ranges from 500° C. to 700° C.; and
   the fast pyrolysis is conducted under the following parameters: 1) heating from 20° C. to 50° C. at a heating rate of 3° C./min; 2) heating from 50° C. to $T_{max}$-50° C. at a heating rate of 10° C./min; 3) heating from $T_{max}$-50° C. to $T_{max}$° C. at a heating rate of 1° C./min; and 4) naturally cooling to room temperature, wherein the $T_{max}$ ranges from 500° C. to 700° C.

* * * * *